(12) United States Patent
Salmi et al.

(10) Patent No.: US 7,158,626 B2
(45) Date of Patent: Jan. 2, 2007

(54) METHOD FOR CALL ESTABLISHMENT

(75) Inventors: Ari J. Salmi, Oulu (FI); Pasi J. Karjalainen, Joensuu (FI); Marko Parttimaa, Oulu (FI); Kirsi Kelloniemi, Oulu (FI); Kari Kummu, Oulu (FI); Alexander Bajenov, Oulu (FI)

(73) Assignee: Nokia Corporation, Espoo (FI)

( * ) Notice: Subject to any disclaimer, the term of this patent is extended or adjusted under 35 U.S.C. 154(b) by 493 days.

(21) Appl. No.: 10/024,083

(22) Filed: Dec. 17, 2001

(65) Prior Publication Data

US 2002/0086701 A1    Jul. 4, 2002

(30) Foreign Application Priority Data

Dec. 21, 2000   (FI) ................................. 20002824

(51) Int. Cl.
*H04M 3/42* (2006.01)
(52) U.S. Cl. ........................... 379/221.01; 379/221.02; 455/445; 455/447
(58) Field of Classification Search ........... 379/221.01, 379/221.02; 455/445, 417
See application file for complete search history.

(56) References Cited

U.S. PATENT DOCUMENTS

| 5,590,397 | A | 12/1996 | Kojima ....................... 455/564 |
| 5,742,668 | A * | 4/1998 | Pepe et al. ................... 455/415 |
| 5,742,905 | A * | 4/1998 | Pepe et al. ................... 455/461 |
| 5,754,640 | A | 5/1998 | Sosnowski ............. 379/221.01 |
| 5,799,156 | A | 8/1998 | Hogan et al. ................ 709/237 |
| 5,991,292 | A * | 11/1999 | Focsaneanu et al. ........ 370/352 |
| 6,154,660 | A | 11/2000 | Singh .......................... 455/417 |
| 6,418,324 | B1 * | 7/2002 | Doviak et al. ........... 455/426.1 |
| 6,798,767 | B1 * | 9/2004 | Alexander et al. .......... 370/352 |
| 6,845,250 | B1 * | 1/2005 | Ramalingam ............... 455/560 |

FOREIGN PATENT DOCUMENTS

| WO | WO 98/20662 | 5/1998 |
| WO | WO 98/20663 | 5/1998 |
| WO | WO 99/25102 | 5/1999 |

\* cited by examiner

*Primary Examiner*—Quynh H. Nguyen
(74) *Attorney, Agent, or Firm*—Perman & Green, LLP

(57) ABSTRACT

A call establishment method and corresponding communications terminal for a trunked radio network such as TETRA (708, 709) to establish a call from one network (700) to another network (711, 712, 730, 741) through a gateway (701, 713, 733, 740). A target telephone number is dialled at the calling communications terminal storing unique associations between telephone numbers and call types. Alternatively the call type is requested from a user of the calling communications terminal in case no call type is stored with the target telephone number. The gateway (701, 713, 733, 740) through which the target telephone number can be reached is then selected on the basis of the call type.

29 Claims, 4 Drawing Sheets

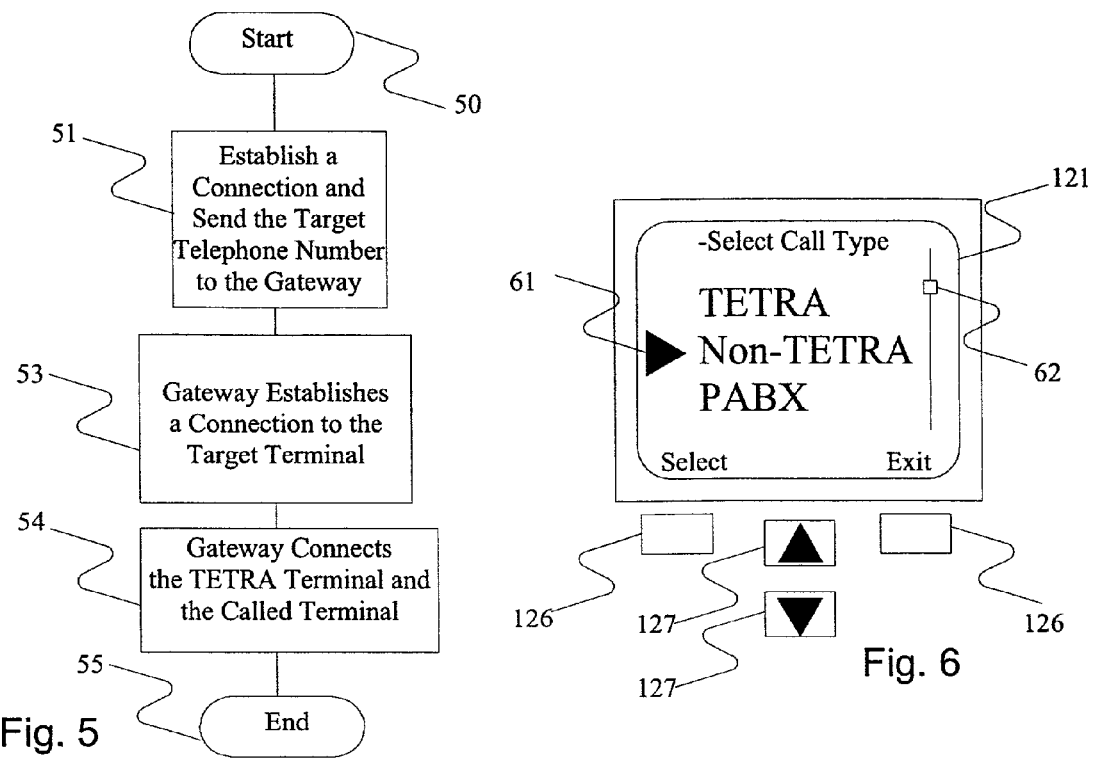
Fig. 5
Fig. 6
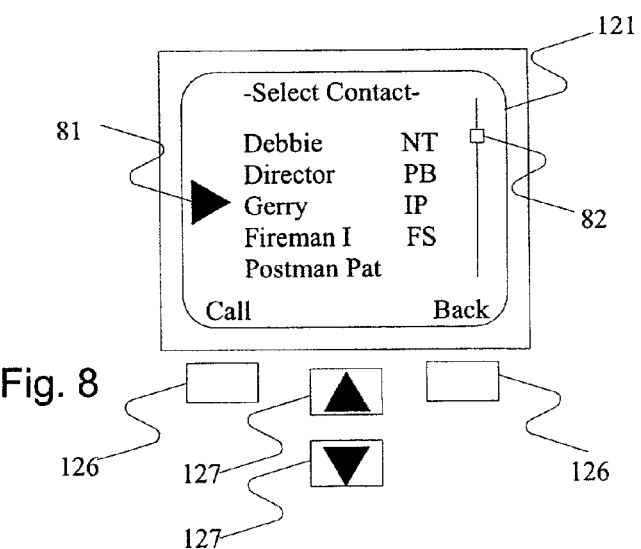
Fig. 8

METHOD FOR CALL ESTABLISHMENT

SCOPE OF THE INVENTION

The invention relates to a method for establishing a telecommunications link between a calling terminal connected to a first telecommunications network and a target terminal connected to a second telecommunications network. It is particularly, but not exclusively, related to a mobile communication system comprising a first telecommunications network and a second telecommunications network which is capable of establishing a telecommunications link between a calling terminal connected to the first telecommunications network, and a target terminal connected to the second telecommunications network.

BACKGROUND OF THE INVENTION

Trunked radio networks are typically used by a closed user group, such as company employees, the police, the fire brigade, other public safety authorities or military forces. The early trunked radio networks were completely closed without any interconnection to other communications networks. Their main use was traditionally to share information between a central node and the personnel carrying radio terminals.

Inter-network calls from a trunked radio network to another network are, however, desirable since a user carrying a trunked radio terminal for the particular trunked radio network may need to be in contact with persons on other trunked radio networks or public communication networks not being connected to the particular trunked radio network. Without any inter-connection between the particular trunked radio network and other networks, the user would need to carry separate terminals, one for each network.

A known solution for inter-connection between networks uses a gateway that can be addressed from one network to route connections to another network connected to the gateway. A telephone call made by a user is first routed to the gateway and there the routing is carried out to establish a link to the recipient of the telephone call. The user first dials a gateway number to establish a connection to a specific gateway relaying the used trunked radio network to a destination network and then gives an intended target telephone number. This, however, is not seen as a satisfactory solution, because a typical user does not want to remember both the telephone number of an intended recipient and the gateway number related to that telephone number.

A solution to the above-mentioned problem is given in WO98/20662. This document discloses a calling subscriber station having a correspondence table storing the numbers of necessary gateways. When a telephone number is dialled, the calling subscriber station associates a corresponding gateway number on the basis of analysis of, for example, the leading digit of the dialled telephone number.

However, the numbering schemes of different networks are not always consistent and this solution is system dependent. For this reason, this document proposes adding a separate character, for example, a prefix or a suffix, which will then be recognised by the calling subscriber station to associate the telephone number with the corresponding gateway. This approach is also unsatisfactory, since the user of the calling subscriber station would have to know which character to add and where to place it in the dialling sequence when calling a subscriber in another network.

Furthermore, a user of a trunked radio network communications terminal is likely also to be using a cellular mobile station in connection to a Public Land Mobile Network (PLMN). Whether the used cellular mobile station is in private or business use, the user is likely to get used to the functioning of its user interface. Therefore, the need to remember different prefixes for different networks for trunked radio network use is cumbersome.

SUMMARY OF THE INVENTION

According to a first aspect of the invention there is provided a method for requesting a telecommunications link between a calling terminal having a memory, the calling terminal being in connection with a first telecommunications network and being used by a user, and a target terminal associated with a target telephone number, the target terminal being in connection with a second telecommunications network, where the first telecommunications network and the second telecommunications network are interconnected using a gateway wherein establishing the telecommunications link is initiated by the user dialling the target telephone number associated with the target terminal, the method comprising the steps of:

associating the target telephone number with a call type;
extracting from the memory a gateway address of the gateway associated with the call type, and;
requesting the telecommunications link through the gateway using the gateway address.

According to a second aspect of the invention there is provided a calling terminal having a transceiver, a processor, a user interface and a memory, the calling terminal being used by a user and being arranged to be in connection with a first telecommunications network and capable of establishing a telecommunications link with a target terminal associated with a target telephone number, the target terminal being arranged to be in connection with a second telecommunications network, the first telecommunications network and the second telecommunications network being interconnected by a gateway wherein when the target telephone number is dialled at the calling terminal the processor is able to check the memory to find a call type associated with the target telephone number, extract from the memory a gateway address of the gateway associated with the call type, operate the transceiver to establish a communications path to the gateway using the gateway address and send the target telephone number to the gateway using the gateway address for the gateway to establish the telecommunications link with the target terminal.

According to a third aspect of the invention there is provided a telecommunications system comprising a first telecommunications network and a second telecommunications network, the first telecommunications network and the second telecommunications network being interconnected by a gateway, wherein a communication link with a call type can be established through the gateway between a calling terminal being in connection with the first telecommunications network and a target terminal being in connection with the second telecommunications network and being referred to by a target telephone number, characterised in that the calling terminal is able to store an association of the call type related to the target telephone number and initiate a connection to the target telephone number via the gateway associated with the call type.

More specifically, the invention relates to a method, a subscriber station and a telecommunications system where the first telecommunications network is a trunked radio network, such as TETRA ("Terrestrial Trunked Radio" or "Trans-European Trunked Radio") network and the second telecommunications network is either the same trunked radio network, another trunked radio network, a PLMN such as GSM ("Groupe Spécial Mobile" or "Global System for Mobile communications") or any other cellular network, or a wire line network, such as Public Switched Telephone network (PSTN) or Integrated Services Digital Network (ISDN). The second network can also be a packet data network, such as the Internet.

The invention will now be described by way of example only with reference to the accompanying drawings, in which FIG. 1 shows a communications terminal according to the present invention.

FIG. 5 shows connection establishment according to the present invention.

FIG. 6 shows an exemplary user interface of a communications terminal according to the present invention.

FIG. 8 shows an example of how the contents of the phone book can be shown on the display.

DETAILED DESCRIPTION OF THE INVENTION

An embodiment of the present invention will now be described in which it is applied to a TETRA system. The invention, however, is not limited to TETRA or other trunked radio systems, but can be implemented in any cellular system.

Figures 1, 2:
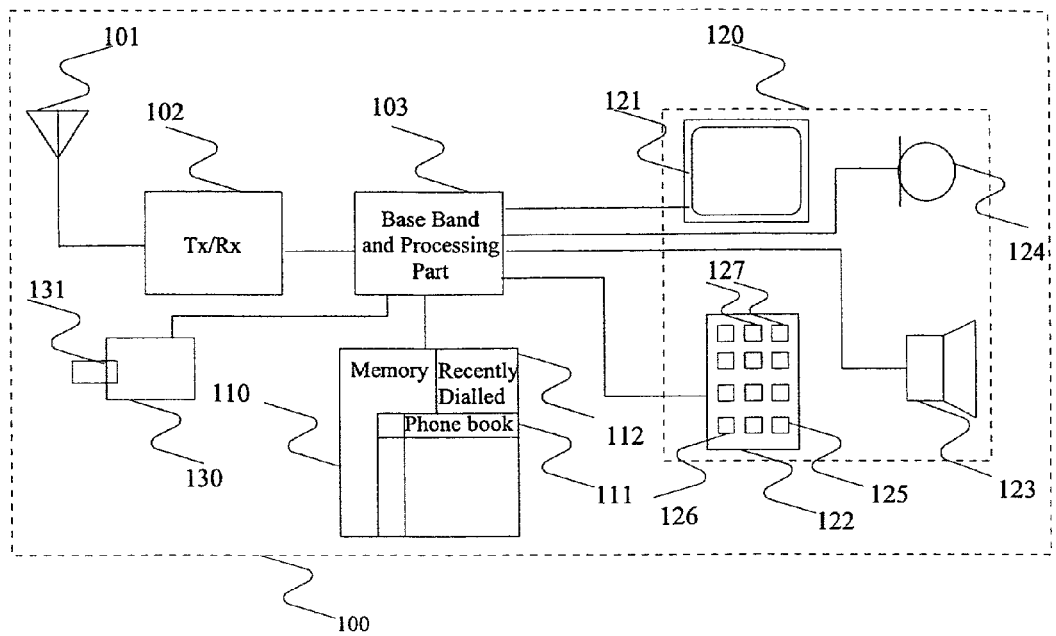
FIG. 2 shows an exemplary construction of a phone book memory block according to the present invention.

FIG. 1 shows a communications terminal 100 suitable for use in a method according to the present invention. The terminal 100 comprises an antenna 101, a transceiver 102, a base band and processing part 103 connected to a memory 110 and a user interface 120. The memory 110 further comprises a part referred to as a phone book 111, which contains entries related to contacts of the user of the terminal 100 and a list of most recently dialled numbers 112. The construction of the phone book 111 is shown in FIG. 2. The user interface 120 includes a display 121, a keyboard 122, a speaker 123 and a microphone 124. The keyboard 122 comprises a send-key 125, at least one selecting key 126 and keys 127 for navigation. A user of the terminal 100 is then able to move a cursor on the display to point at the desired position by using the navigation keys 127 and to make the selection with the selecting key 126. In a preferred embodiment of the invention at least one of the keys 125, 126, 127 is a soft-key. In yet another embodiment of the invention the terminal 100 comprises a module 130 for receiving a Subscriber Identification Module (SIM) card 131. In an alternative embodiment of the invention the phone book memory is located on the SIM card 131.

FIG. 2 shows an example of the contents of the phone book 111. It contains several entries 24, 25 each comprising fields for alphanumeric information, such as a contact name field 21, numerical information, such as a telephone number field 22 and further information including a call type field 23. The entries 24 and 25 both contain a contact name in the contact name field 21 and a target telephone number in the telephone number field 22. The entry 24 can be seen to also include an indication of the call type in the call type field 23. Thus, a phone call to a target terminal related to the target telephone number of the entry 24 specified in the telephone number field 22, is always considered to be a TETRA call, as indicated in the call type field 23.

On the other hand, some telephone numbers may have been stored in the phone book 111 without any indication of the related call type being stored in the telephone number field 22 of that specific entry. This can be seen in the entry 25 which contains the name of the entry in the contact name field 21 and the target telephone number in the telephone number field 22, but the call type field 23 is empty. When the telephone number is used to make a phone call the terminal 100 has to prompt the user of the terminal 100 to select the call type related to that specific target telephone number. This will be discussed later with reference to FIGS. 1 and 4. Once the user has given the call type and initiates the phone call the given call type is stored in the call type field 23 of that specific entry.

The person skilled in the art clearly understands that the number of different fields 21, 22, 23 is not limited to three and phone book entries 24, 25 could further contain fields, for example, for e-mail address and alternative telephone numbers. In the latter case there would clearly also be a call type field for each telephone number.

Figure 3:
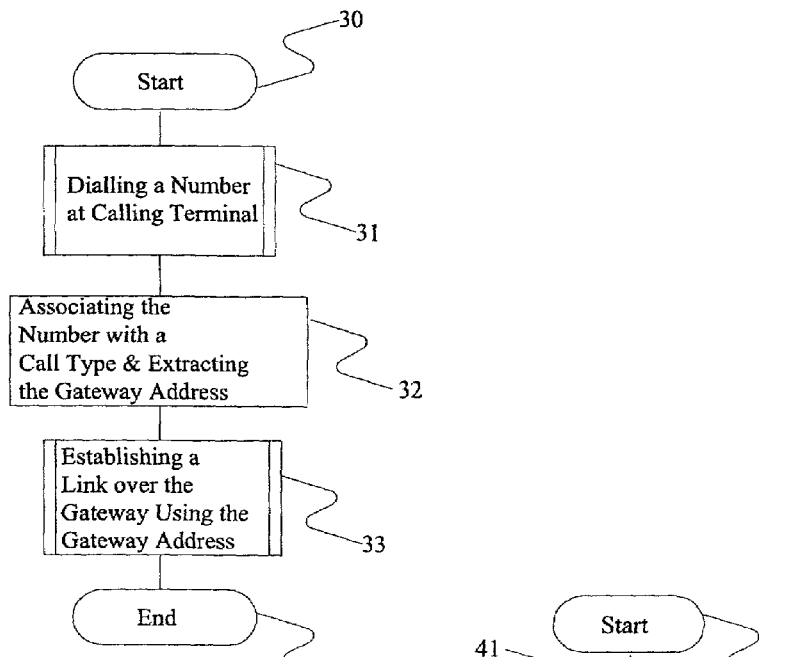
FIG. 3 shows a process according to the present invention.

FIG. 3 shows a flow diagram illustrating a process according to the present invention. The process starts at step 30 and at step 31 the user of a calling terminal dials a target telephone number of a target terminal that he wants to have connection with. The dialling can be done either by entering the target telephone number of the target terminal digit-by-digit using the user interface 120 or browsing the phone book 111 and selecting the desired entry to be called from the phone book. Once the number has been entered or selected, the calling terminal associates the target telephone number with a call type at step 32 where the calling terminal also extracts from the memory 110 a gateway address for a particular gateway, which is related to the associated call type. The process then proceeds to step 33, where a connection to the target terminal is requested to be established using the gateway related to the associated call type using the gateway address that was extracted at step 32. Once the link has been established the process ends at step 34.

It is to be understood that the term "dialling" is used here in a wide sense. It applies both to the case of entering the digits of a telephone number digit-by-digit and the case where the target telephone already resides on the calling terminal in a memory such as the phone book 111. The term "dialling" is also not to be understood as any kind of restriction to the way the target telephone number is entered or extracted from the memory.

Figure 4:
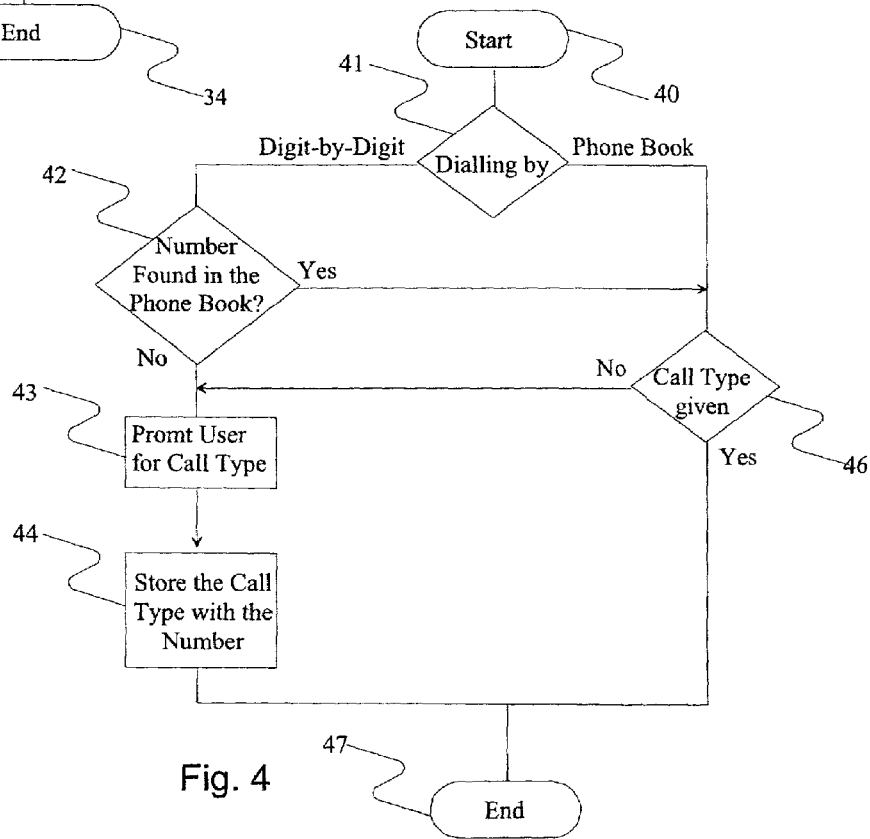
FIG. 4 shows associating a gateway to a call type according to the present invention.

Step 31 is shown in more detail in FIG. 4 as a sub-process. The sub-process starts at step 40 and proceeds to step 41 where it is checked if the target telephone number dialled at step 31 was dialled digit-by-digit by using the user interface 120 or using the phone book 111. If the dialling was done by entering the target telephone number digit-by-digit, the process proceeds to step 42 where it is checked if the target telephone number can be found in the phone book 111 of the terminal 100. If the target telephone number cannot be found in the phone book 111, the process continues to step 43 where the user of the calling terminal is prompted to select a call type of the target telephone number among the available call types, which are shown to the user. Once the user has selected the call type, the call type is stored with the target telephone number in the memory at step 44. The process then ends at step 47.

Dialling digit-by-digit as referred to in relation to step 31 is preferably done by using the keyboard 122. In an alternative embodiment of the present invention it is done by speaking the digits of the target telephone number into the microphone 124. The base band and processing part 103 then transforms the spoken digits into electrical signals by using a method for speech recognition. It is clear to the person skilled in the art how this can be done. Speech recognition methods are not in the scope of the present invention and will not be discussed here.

If, on the other hand, the target telephone number can be found in the terminal phone book 111 at step 42, the process continues to step 46 in which it is checked whether the entry 24, 25 in the phone book 111 containing the target telephone number also contains a call type relating to the target telephone number. If no call type for the dialled target telephone number can be found in the terminal phone book 111, the process continues to step 43 and proceeds further as described above.

If, at step 41, the terminal phone book 111 is used to dial the target telephone number, the process continues to step 46 in which it is checked whether the phone book 111 contains a call type for the target telephone number. If no call type can be found for the target telephone number from the phone book 111, the process continues to step 43 and follows the steps which are used when the target telephone number is dialled digit-by-digit. However, if a call type for the target telephone number can be found in the phone book 111, the process ends at step 47.

If the target telephone number can be found in the memory 110, storing of the call type with the target telephone number at step 44 is preferably done in the phone book 111 of the calling terminal. However, if the target telephone number cannot be found in the phone book 111 of the calling terminal, the target telephone number with the associated call type is preferably stored in the list of most recently dialled numbers 112 of the calling terminal.

Call establishment of step 33 of FIG. 3 is described in more detail in FIG. 5. The process starts at step 50 and proceeds to step 51 where the dialled target telephone number is added to the gateway address to form an air interface address and a connection is established to the gateway address using the air interface address. The target telephone number is extracted from the air interface address at the gateway, the gateway establishes a connection to the terminal associated with the target telephone number at step 53 and carries out a connection set-up between the calling TETRA terminal and the called terminal on step 54 after which the process ends at step 55.

In an alternative embodiment of the invention a phone book stored on the SIM card memory corresponding to the phone book 111 is used instead of the terminal memory 111. In this case the same kind of procedure is used as when the phone book of the terminal memory is used, except that the memory of the SIM card is addressed. The selection can be done, for example, by means of a menu structure in the user interface of the terminal. The memory selection is known to the person skilled in the art and so it is not necessary to describe it further.

The way in which the connections from the calling terminal to the gateway and from the gateway to the target terminal are established is not essential to the present invention and will not be described in detail. It is known to one skilled in the art that these can be done in various ways.

FIG. 6 shows the display 121 with selecting keys 126 and navigation keys 127. On the display 121 a set of available call types is shown together with a cursor 61 indicating one of them. In a preferred embodiment of the present invention, the available call types also comprise "FSSN call" and "IP call" in addition to those shown on the display 121. FSSN refers to a Fleet Specific Short Number and IP to Internet Protocol.

Functioning of a TETRA terminal according to FIG. 1 will be described referring to FIGS. 2, 6, and 7.

Figure 7:
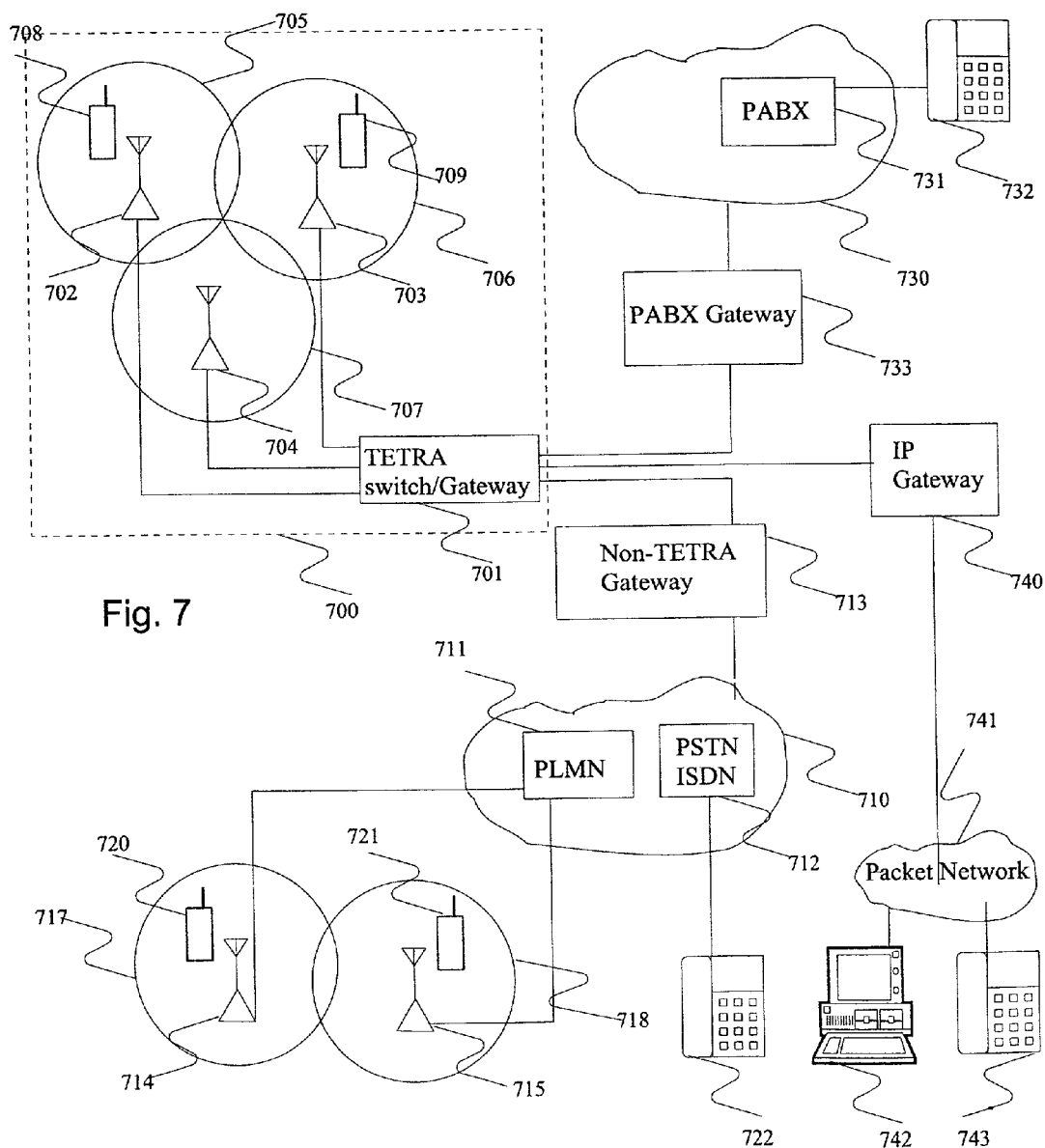
FIG. 7 shows a telecommunications system according to the present invention.

Referring now to FIG. 7, when a user of a terminal 708 (such as terminal 100 presented in FIG. 1) desires to establish a telecommunications link with a user of another terminal 709, 720, 721, 722, 732, 742, 743 he operates the user interface 120 of the terminal 708 to input a telephone number of the target terminal. If the information related to the target terminal has been stored in the phone book 111 of the terminal 708, the user is able to operate its user interface 120 to browse through the entries stored in the phone book 111 to find the desired entry by using, for example, the name of the entry. An example of the display 121 when browsing through the phone book 111 is shown in FIG. 8. Once the desired entry is found, the user selects it by pressing the send-key 125 and the calling terminal initiates a request for the telecommunications link with the target terminal. A person skilled in the art clearly understands that instead of a send key other keys can be used, for example, a Push-to-Talk (PTT) button of the terminal 708 or a corresponding soft key 126.

When the send-key 125 is pressed the base band and processing part 103 further checks if the entry selected by pressing the send-key 125 contains an assigned call type stored with the target telephone number. In the event that a call type stored with the target telephone number can be found in the phone book 111, the base band and processing part 103 checks the memory 110 to associate the correct gateway and extracts a gateway address for the gateway from the memory. The base band and processing part 103 operates the Tx/Rx part 102 and the antenna 101 to establish a communication path through a base station 702 to the gateway 701, 713, 733, 740 associated with the indicated call type using the air interface address comprising the gateway address and the target telephone number. The gateway then establishes a second communication path to the target terminal using the target telephone number extracted from the air interface address and connects the communication paths to complete a link between the calling terminal and the target terminal.

The air interface address has been described earlier with reference to FIG. 5.

The gateway—call type correspondence is preferably stored in a correspondence table in the memory 110 of the calling terminal. The structure and updating of the correspondence table are not a subject of the current invention and will not be discussed further.

If, on the other hand, no call type is assigned with the selected target telephone number in the phone book 111, the base band and processing part 103 prompts the user of the calling terminal to select the call type of the target telephone number. In a preferred embodiment of the present invention the display 121 looks as depicted in FIG. 6 showing a line describing each possible call type with a cursor 61 in the beginning of one of the lines. The user of the terminal is then able to move the cursor 61 to point at the desired call type by using the navigation buttons 127 and make the selection with the key 126. Once the call type has been selected, the base band and processing part 103 stores the selection in the phone book 111 with the selected target telephone number and checks the memory 110 to associate the correct gateway and extracts a gateway address for the gateway from the memory. Establishing the communication link between the calling terminal and the target terminal can subsequently be done as was described in the foregoing in the event that a call type stored with the target telephone number can be found in the phone book 111.

It is clear to the person skilled in the art that the number of available call types is not limited to three and, in the case that all available call types do not fit onto the display 121 at once, a scroll bar 62 can be used to indicate to the user of the calling terminal that more selections can be viewed than presently are shown on the display. In the preferred embodiment of the present invention the available call types also comprise FSSN call and IP call, as described earlier, which, thus, in the case of FIG. 6 do not fit on the display, but can be accessed by scrolling the contents of the display 121 with help of the navigation keys 127.

However, it is possible that the user of the calling terminal is calling a target terminal whose information has not been stored in the phone book 111 of the calling terminal and, thus, has to dial the telephone number of the target terminal digit-by-digit by using the user interface 120. It is also possible that the user is not aware or does not remember that the information has already been stored in the phone book 111 of the calling terminal. When the user in this case dials the telephone number of the target terminal and presses the send button 125, the base band and processing part 103 of the calling terminal checks the contents of the phone book 111 to find a match between the dialled target telephone number and the numbers stored in the phone book 111. If a match can be found the base band and processing part 103 further checks if the found entry contains a call type 23 stored with the target telephone number 22 of the target terminal. In case a call type stored with the number can be found in the phone book 111, the base band and processing part 103 checks the memory 111 to associate the correct gateway and extracts a gateway address for the gateway from the memory. Establishing the communication link between the calling terminal and the target terminal can subsequently be done as was described in the foregoing in the event that a call type stored with the target telephone number can be found in the phone book 111.

If the dialled target telephone number can be found in the phone book 111 of the calling terminal, but no call type is assigned to it, the base band and processing part 103 prompts the user of the calling terminal to select the call type of the dialled target telephone number of the target terminal. Referring to FIG. 6, the user of the calling terminal moves the cursor 61 to highlight the desired call type by using the navigation buttons 127 and makes the selection. Referring back to FIG. 1, once the call type has been selected, the base band and processing part 103 stores the selection in the phone book 111 with the dialled target telephone number and checks the memory 110 to associate the correct gateway and extracts a gateway address for the gateway from the memory. Establishing the communication link between the calling terminal and the target terminal can subsequently be done as was described in the foregoing in the event that a call type stored with the target telephone number can be found in the phone book 111.

Further, in a case where no match can be found in the phone book 111 with the target telephone number dialled digit-by-digit by using the user interface 120, the base band and processing part 103 prompts the user of the calling terminal to select the call type related to the target telephone number. Referring to FIG. 6, the user of the calling terminal moves the cursor 61 to point at the desired call type by using the scroll buttons 127 and makes the selection. Referring back to FIG. 1, once the call type has been selected, the base band and processing part 103 stores the selection together with the telephone number of the target terminal in the last dialled numbers memory and checks the memory 110 to associate the right gateway and extracts a gateway address for the gateway from the memory. Establishing the communication link between the calling terminal and the target terminal can subsequently be done as was described in the foregoing in the event that a call type stored with the target telephone number can be found in the phone book 111.

According to another embodiment of the invention there are numbers for which prompting for or storing of the call type is not necessary. In the TETRA system, the user of the calling terminal is able to call a "Fleet Specific Short Number" (FSSN) by keying in the hash-sign (#) followed by a short code number. Any number keyed in after the hash-sign is handled as an FSSN number which is added to the FSSN base address to create the air interface address. In a preferred embodiment of the present invention the FSSN base address is 15 000 000. Thus, in the case a sequence "#23" is dialled the air interface address will be 15 000 023 Since a number starting with a hash-sign is by definition a FSSN number the calling terminal does not have to prompt the user to select a call type. If, on the other hand, dialling is started with a plus-sign (+) the following number sequence is automatically interpreted to be an international telephone number, the related call type being, thus, automatically "Non-Tetra call". The + sign will be interpreted, in the "Non-Tetra" gateway 713, as the international call prefix in use in the network to which the gateway provides interconnection.

In a preferred embodiment of the invention an FSSN is stored in the phone book 111 without the leading hash-sign and the call type is stored as "FSSN call".

Operation of a telecommunications system including the calling terminal 708, described above, will now be described with reference to FIG. 7. A TETRA network 700 is shown having a TETRA switch and base stations 702, 703 and 704. The base stations define cells 705, 706 and 707, respectively. A Non-TETRA gateway 713 provides interconnection between the TETRA network 700 and the Non-Tetra network 710. This may be a PLMN 711 or a wire line network 712 like PSTN or ISDN. A PABX gateway 733 provides interconnection between the TETRA network 700 and a private network 730. An IP gateway 740 provides interconnection between the TETRA network 700 and a packet switched network 741. It is clear to the person skilled in the art that the number of the possible networks is not limited to four. Also the number of cells 704, 705, 706 described inside the TETRA network 700 and the number of cells 717, 718 defined by the corresponding base stations 714, 715 in the PLMN network 711 respectively as well as the number of TETRA terminals 708 and 709, the number of PLMN terminals 720 and 721, the number of PSTN or ISDN terminals 722, the number of PABX terminals 733 and the number of internet terminals 742, 743 are to be considered as being purely illustrative, since the actual numbers of cells and terminals would be higher.

When a user of the calling terminal 708 wants to make a phone call he dials the telephone number of the target terminal and presses the send button as described above in connection with the description of the terminal. When a call type has been assigned to the dialled telephone number of the target terminal the calling terminal initiates a radio path towards the base station 702 and the connection is further routed through the TETRA switch 701 to the corresponding gateway 701, 713, 733 or 740 depending on the call type. If the call type indication is "Non-TETRA call" the call is routed to the Non-TETRA gateway 713 and the target telephone number is sent to the gateway 713 through the established connection. The gateway 713 extracts the telephone number of the target terminal from the air interface address and further routes the connection to the target terminal 720, 721, 722 in a related network, for example, PLMN or PSTN.

If the dialled target telephone number is associated with a call type "PABX call" the PABX gateway 733 is connected instead and the telephone number of the target terminal is sent through the connection. The gateway 733 extracts the telephone number of the target terminal from the air interface address and further routes the phone call to the related communications terminal in the PABX network.

If the dialled target telephone number is associated with a call type "IP call", the IP gateway 740 is connected and the link to the target terminal 742, 743 is routed through that gateway, respectively.

If the dialled target telephone number is associated with a call type "TETRA call", the TETRA switch 701 itself is considered as the gateway and the calling network and the target network are the same.

FIG. 8 shows an example of the display 121 when the user of the calling terminal is browsing through the phone book 111. The phone book entries are shown on the display preferably in alphabetical order when the phone book is browsed on the basis of contact names. After each contact name the call type related to that entry is shown by a sign 83 shown in FIG. 8 as a two-letter abbreviation of the call type. In a currently preferred embodiment of the invention the call type is shown in the field 83 by a specific icon indicating the call type relating to the telephone number of that specific contact entry.

The present invention has been described above with reference to preferred embodiments. However, those skilled in the art will recognise that changes and modifications may be made in these preferred embodiments without departing from the scope of the present invention. For example, while the present invention is described herein in connection with a particular trunked radio system, the present invention may also be used in connection with a wide variety of cellular systems and other radio telecommunication systems. These, and other changes and modifications, which are clear to those skilled in the art, are intended to be included within the scope of the present invention as defined by the enclosed claims.

The invention claimed is:

1. A method for requesting a telecommunications link between a calling terminal having a memory, the calling terminal being in connection with a first telecommunications network and being used by a user, and a target terminal associated with a target telephone number, the target terminal being in connection with a second telecommunications network, where the first telecommunications network and the second telecommunications network are interconnected using a gateway wherein establishing the telecommunications link is initiated by the user dialling the target telephone number associated with the target terminal, the method being characterised by the steps of:
associating the target telephone number with a single call type; the association being made in the memory of the calling terminal;
extracting from the memory a gateway address of the gateway associated with the call type, and;
requesting the telecommunications link through the gateway using the gateway address.

2. A method according to claim 1, wherein the step of associating further comprises the steps of:
comparing the target telephone number with numbers stored in the memory, and;
in the event that a match is found, extracting the call type from the memory.

3. A method according to claim 1, wherein the step of associating further comprises the steps of:
comparing the target telephone number with numbers stored in the memory, and;
in the event that no match is found, prompting the user to select the call type and storing the target telephone number with the call type in the memory.

4. A method according to claim 1, wherein dialling the target telephone involves a step of entering the target telephone number digit-by-digit using a keyboard of the calling terminal.

5. A method according to claim 1, wherein dialling the target telephone involves a step of entering the target telephone number digit-by-digit by using speech recognition.

6. A method according to claim 1, wherein dialling the target telephone involves a step of extracting the target telephone number from the memory.

7. A method according to claim 1, wherein in the event that no call type associated with the target telephone number is found in the memory, the user is prompted to select the call type to be associated with the target telephone number and the call type is stored with the target telephone number in the memory.

8. A method according to claim 1, wherein the call type is stored in a phone book in the event that the phone book contains an entry for the target telephone number and in a list of most recently dialled numbers in the event that the phone book does not contain an entry for the target telephone number.

9. A method according to claim 1, wherein the call type is selected from a group consisting of a TETRA call, a Non-TETRA call, a PABX call, an FSSN call and an IP call.

10. A method according to claim 1 wherein in the event that the first character of the target telephone number is a hash-sign (#) the call type is considered to be an FSSN call.

11. A method according to claim 1, wherein in the event that the first character of the target telephone number is a plus-sign (+) the call type is considered to be a Non-TETRA call.

12. A method according to claim 1, wherein the first communications network is a TETRA network.

13. A method according to claim 1, wherein the second communications network is selected from a group consisting of a TETRA network, a PLMN, a PSTN, an ISDN, a private network connected to a PABX and a packet network.

14. A communications terminal comprising:
a transceiver for two way information exchange with a first telecommunications network;
a memory, and;
data processing means for controlling the transceiver and the memory, wherein the terminal is used to establish communication with a target telephone number associated with a second telecommunications network, the first telecommunications network and the second telecommunications network being interconnected by a gateway, wherein the data processing means associates the target telephone number with a single call type, the association being made in the memory, compares the target telephone number with a stored telephone number stored in the memory, extracts the call type from the memory, extracts a gateway address of the gateway associated with the call type which interconnects the first telecommunications network and the second telecommunications network and operates the transceiver to establish communication with the target telephone number through the gateway by sending a message containing the target telephone number and the gateway address to the first telecommunications network.

15. A communications terminal according to claim 14, wherein the data processing means further comprises comparing means connected to the memory for extracting the stored telephone number from the memory and comparing the stored telephone number with the target telephone number and as a response to a match between the target telephone number and the stored telephone number extracting the call type related to the stored telephone number from the memory.

16. A communications terminal according to claim 15, further comprising a user interface wherein as a response to the comparing means not finding any stored telephone number matching the target telephone number the data processing means operates the user interface to display available call types for a user to operate the user interface to select the call type.

17. A communications terminal according to claim 16, the memory further comprising a phone book and a list of most recently dialled numbers wherein in the event that the target telephone number is found in the phone book the call type is stored with the target telephone number in the phone book, and in the event that the target telephone number is not found in the phone book the call type is stored with the target telephone number in the last dialled numbers memory.

18. A communications terminal according to claim 14, wherein the call type is selected from a group consisting of a TETRA call, a Non-TETRA call, a PABX call, a FSSN call and an IP call.

19. A communications terminal according to claim 14, wherein the comparing means further checks the first character of the target telephone number and as a response to the first character being a hash-sign (#) the call type is associated as an FSSN call.

20. A communications terminal according to claim 14, wherein the comparing means further checks the first character of the target telephone number and as a response to the first character being a plus-sign (+) the call type is associated as a Non-TETRA call.

21. A calling terminal according to claim 13, wherein the calling terminal is a terminal according to the TETRA standard.

22. A telecommunications system with a plurality of gateways for offering interconnection between a first telecommunications network and a second telecommunications network, wherein a communication link can be established between a first communications terminal being in connection with the first telecommunications network and a second communications terminal being in connection with the second telecommunications network through one of the plurality of gateways, the second communications terminal being associated with a target telephone number wherein the target telephone number is associated with a single call type in the memory of the first communications terminal and the communication link from the first communications terminal to the second communications terminal is established over the one of the plurality of gateways related to the call type.

23. A telecommunications system according to claim 22, wherein the target telephone number is associated with the call type on the basis of data extracted from the first communications terminal.

24. A telecommunications system according to claim 22, wherein the call type is selected from a group consisting of a TETRA call, a Non-TETRA call, a PABX call, an FSSN call and an IP call.

25. A telecommunications system according to claim 22, wherein the first telecommunications network is a TETRA network and the second telecommunications network is selected from a network group consisting of a TETRA network, a PLMN, a PSTN, an ISDN, a private network connected to a PABX and a packet network.

26. A computer program product for establishing a telecommunications link from a first telecommunications network to a target telephone number in a second telecommunications network through a gateway the computer program product comprising:
  computer executable code means to compare the target telephone number with numbers stored on a storage medium;
  computer executable code means to associate the target telephone number with a single call type, the association being made in a memory of a calling terminal in the first telecommunications network;
  computer executable code means to extract a gateway address of the gateway associated with the call type, and;
  computer executable code mans to establish the telecommunications link through the gateway.

27. A computer program product according to claim 26, wherein the computer executable code means to associate is associating the target telephone number with a call type on the basis of contact data.

28. The method of claim 1 further comprising the calling terminal automatically associating the target telephone number with the call type without further interaction by the user.

29. The method of claim 1 further comprising more than one gateway being available to be used for routing the telecommunications link.

* * * * *